(12) United States Patent
Hunt

(10) Patent No.: US 6,557,947 B1
(45) Date of Patent: May 6, 2003

(54) THREE QUARTER FLOATING AUTOMOTIVE AXLE

(75) Inventor: William Gordon Hunt, Roanoke, IN (US)

(73) Assignee: Torque-Traction Technologies, Inc., Holland, OH (US)

(*) Notice: Subject to any disclaimer, the term of this patent is extended or adjusted under 35 U.S.C. 154(b) by 0 days.

(21) Appl. No.: 09/842,712

(22) Filed: Apr. 27, 2001

(51) Int. Cl.[7] ............................................. B60B 35/16
(52) U.S. Cl. ................... 301/137; 475/230; 74/417; 403/359.5; 188/17; 301/105.1
(58) Field of Search ............... 301/105.1, 111, 301/111.06, 124.1, 137, 126; 475/230; 74/417, 607; 403/359.5; 188/17

(56) References Cited

U.S. PATENT DOCUMENTS

| | | | |
|---|---|---|---|
| 1,133,813 A | | 3/1915 | Marmon |
| 3,396,554 A | * | 8/1968 | Westercamp ............... 464/143 |
| 3,992,120 A | * | 11/1976 | Recker ...................... 285/316 |
| 4,124,318 A | * | 11/1978 | Sagady ........................ 403/14 |
| 4,232,569 A | * | 11/1980 | Hauser et al. ............. 475/206 |
| 4,351,407 A | * | 9/1982 | Call ............................ 180/385 |
| 4,538,714 A | | 9/1985 | Kagata et al. |
| 4,815,338 A | * | 3/1989 | Holan et al. ................. 74/417 |
| 4,881,842 A | * | 11/1989 | Farrell ....................... 301/112 |
| 4,986,608 A | * | 1/1991 | Fett ......................... 301/124.1 |
| 5,603,554 A | * | 2/1997 | Monroe et al. .......... 301/105.1 |
| 5,980,417 A | * | 11/1999 | Wopshall, Jr. ............. 475/230 |
| 6,017,097 A | * | 1/2000 | Weir, III .................. 301/105.1 |
| 6,170,628 B1 | * | 1/2001 | Bigley ........................ 180/247 |
| 6,254,196 B1 | * | 7/2001 | Gee ......................... 301/105.1 |
| 6,315,671 B1 | * | 11/2001 | Bilz ......................... 403/359.1 |

FOREIGN PATENT DOCUMENTS

EP          0864868 A1  *  9/1998

* cited by examiner

*Primary Examiner*—S. Joseph Morano
*Assistant Examiner*—Frantz F. Jules
(74) *Attorney, Agent, or Firm*—Liniak, Berenato & White

(57) ABSTRACT

An three-quarter floating axle drive assembly comprising an axle housing having an elongated axle tube, a rotatable axle shaft extending through the axle tube, a hub member rotatably supported on the axle tube through an anti-friction bearing assembly and drivingly connected to an outboard end of the axle shaft, and an axle shaft retainer disposed at an inboard end of the axle shaft provided for preventing an outward axial displacement thereof.

21 Claims, 3 Drawing Sheets

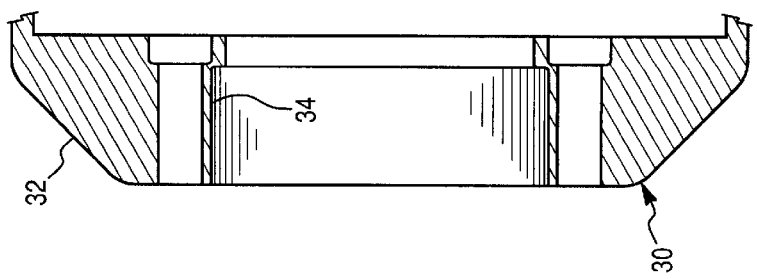
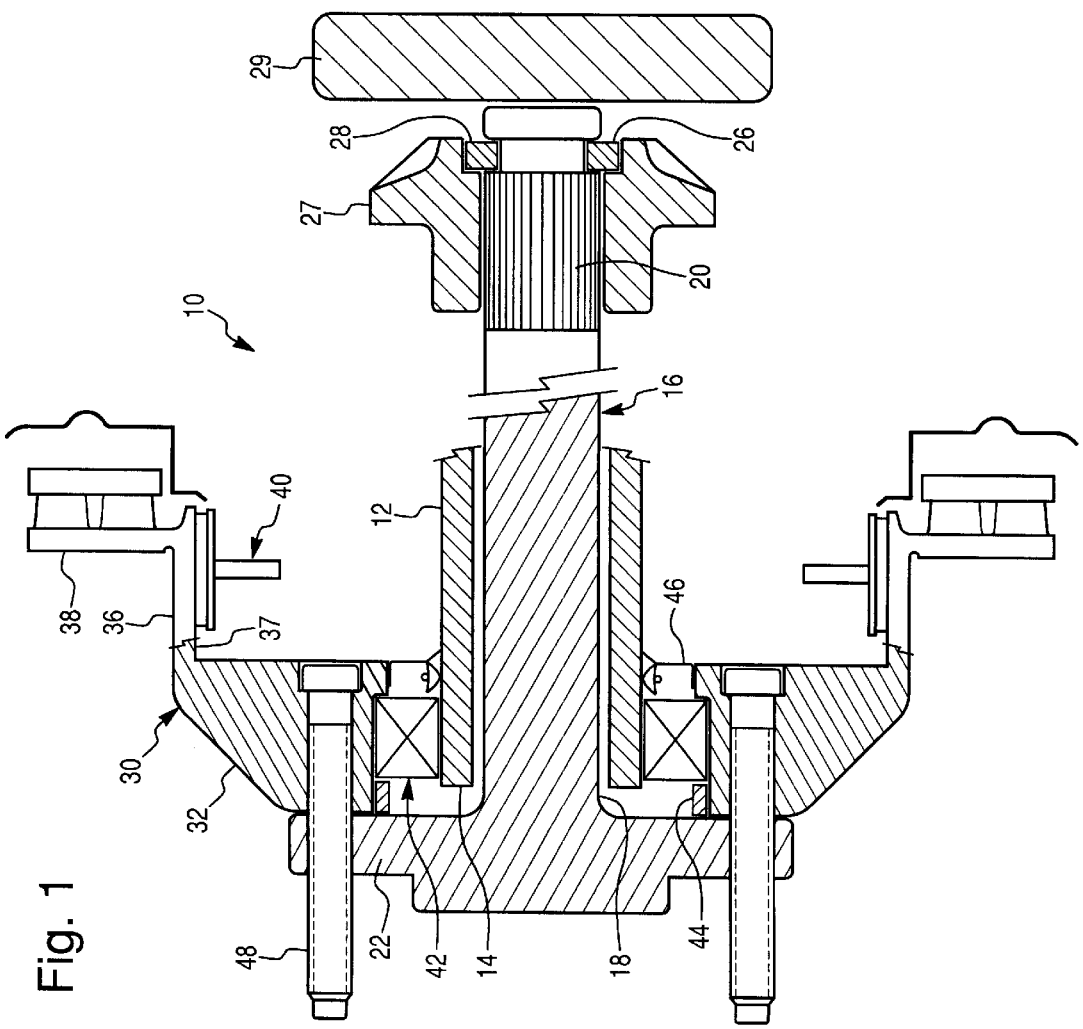

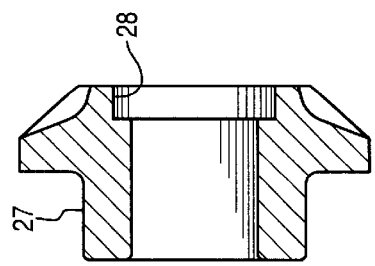
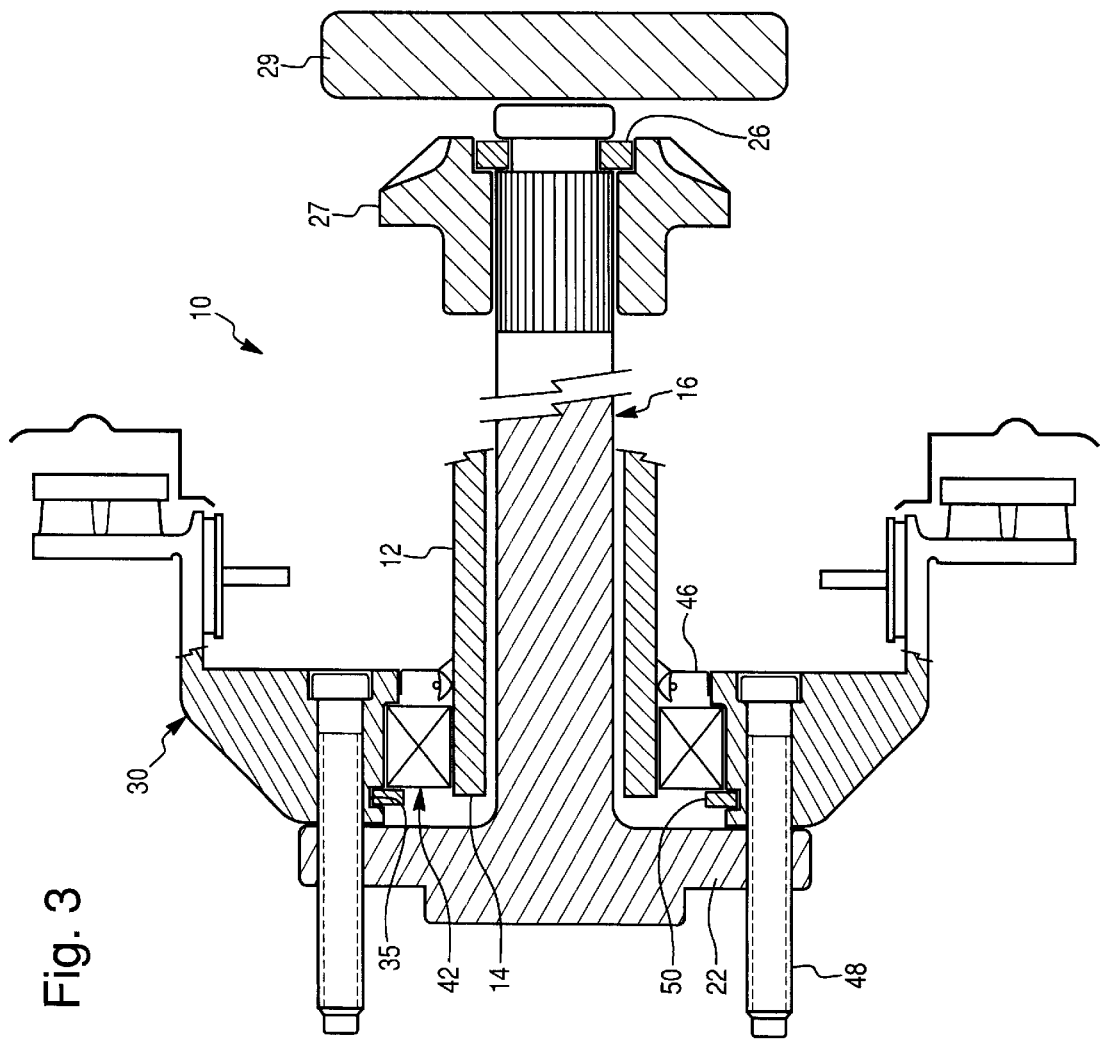

THREE QUARTER FLOATING AUTOMOTIVE AXLE

BACKGROUND OF THE INVENTION

1. Field of the Invention

The present invention relates to axle drive assemblies, and more particularly to a three-quarter floating axle drive assembly having a C-ring axle shaft retainer.

2. Description of the Prior Art

Conventionally, axle drive assemblies of motor vehicles include an axle shaft connecting differential side gears to drive wheels. They typically support a weight of the vehicle.

Currently, light motor vehicles, such as cars, light trucks and Sport Utility Vehicles (SUVs), commonly use a semi-floating axle drive assembly that is the most common type of axle drives. In the semi-floating design, the vehicle wheels are attached directly to the axle shafts, and the axle shafts bear the vehicle weight and cornering forces, while transmitting at the same time a torque necessary to propel the vehicle. Typically, a wheel bearing is directly mounted to the axle shaft for rotationally supporting it within an axle tube of an axle housing. Axial loads due to cornering or the like, are reacted along the axle shaft into a differential cross pin. Thus, less expensive types of the wheel bearings can be used as they are not required to carry thrust loads. The semi-floating axle drives are commonly used in applications below approximately 6,000 pound gross axle weight rating. Higher load ratings are difficult to achieve, primarily due to packaging constraints on the size of the wheel bearings.

Heavy-duty trucks typically use full-floating axles, well known in the art. In the full-floating design, the vehicle weight and cornering forces are carried directly into the axle housing through the wheel bearings and an axle spindle. The vehicle wheels are attached to separate hubs that are rotatably supported on the axle spindles. In this design, the axle shafts only have to transmit the torque necessary to propel the motor vehicle. Since the wheel bearings must react the cornering forces, each hub must have two bearings, usually tapered roller bearings spaced a distance apart. These bearings are retained by a nut, which is threaded into the spindle and must be carefully set for end play to ensure proper performance. The full-floating axles are typically used for application exciding approximately 6,000 pound gross axle weight rating, as there is virtually no constraint on the size of the hubs and the wheel bearings.

Three-quarter floating axle design incorporates features of the semi-floating and full-floating axle designs. While it does have separate hubs, there is only a single wheel bearing per hub. The axle shaft is bolted to the hub, and, thereby, stabilizes thereof. A nut retaining the wheel bearing prevents axial displacement of the axle shaft. Thrust loads due to cornering forces are reacted through the wheel bearing. The axle shaft also carries the bending reaction due to cornering forces.

SUMMARY OF THE INVENTION

The present invention provides an improved three-quarter floating axle drive assembly.

The axle drive assembly in accordance with the preferred embodiment of the present invention includes an axle housing having an elongated axle tube, a rotatable axle shaft extending through the axle tube, a hub member rotatably supported on the axle tube through an anti-friction bearing assembly and drivingly connected to an outboard end of the axle shaft, and an axle shaft retainer disposed at an inboard end of the axle shaft provided for preventing an outward axial displacement thereof.

In accordance with the preferred embodiment of the present invention, the axle shaft retainer is in the form of a slotted washer, or C-ring, fitted within the recess in the inboard end of the axle shaft. Subsequently, the anti-friction bearing assembly does not carry the thrust loads, thus, eliminating a bearing retaining nut typically present in the three-quarter floating axle drive assemblies of the prior art. Also less expensive types of the wheel bearings may be used.

Preferably, the hub member is integrally formed with a disc brake rotor as a single-piece part, preferably by forging or casting.

The axle drive assembly in accordance with the present invention combines the three-quarter floating axle design with the C-ring axle shaft retainer. It permits higher axle load ratings than the existing semi-floating axle designs, and is simpler and lighter than the existing full-floating and three-quarter floating axle designs.

BRIEF DESCRIPTION OF THE DRAWINGS

Other objects and advantages of the invention will become apparent from a study of the following specification when viewed in light of the accompanying drawings, wherein:

FIG. 1 is a partial sectional view of a three-quarter floating axle drive assembly of in accordance with the preferred embodiment of the present invention;

FIG. 2 is a partial sectional view of a hub member in accordance with the present invention;

FIG. 3 is a partial sectional view of a three-quarter floating axle drive assembly of in accordance with the alternative embodiment of the present invention, having a snap-ring bearing retainer;

FIG. 6 is a sectional view of an exemplary side bevel gear.

DETAILED DESCRIPTION OF PREFERRED EMBODIMENTS

Figure 4:
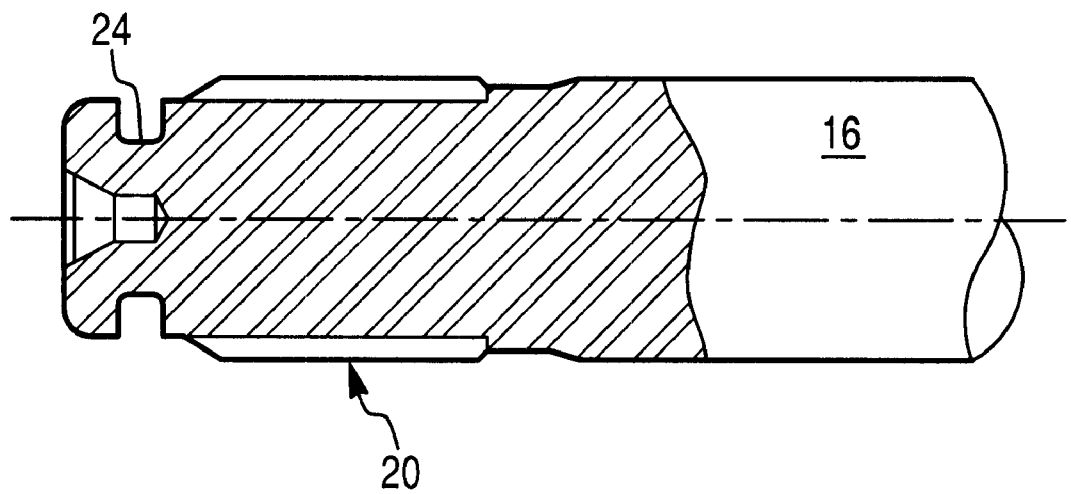
FIG. 4 is a partial sectional view of an axle shaft.

The preferred embodiment of the present invention will now be described with the reference to accompanying drawings.

The present invention is directed to a three-quarter floating axle drive assembly indicated generally at 10 in FIG. 1 that illustrates the preferred embodiment of the present invention. The axle drive assembly 10 of the present invention comprises an axle housing having an elongated axle tube 12, a rotatable axle shaft 16 extending through the axle tube 12, a hub member 30 rotatably supported on the axle tube 12 through an anti-friction bearing assembly 42, and an axle shaft retainer 26 for preventing an outward axial displacement of the axle shaft 16.

The axle shaft 16 has an outboard end 18 and an inboard end 20. The inboard end 20 of the axle shaft 16 is drivingly connected to a side bevel gear 27 of a differential assembly by any appropriate means, such as spline connection formed on the inboard end of the axle shaft. The outboard end 18 of the axle shaft 16 is integrally formed with an axle flange 22 as a single-piece part, preferably by forging. However, any other appropriate method of forming the axle shaft with integral axle flange known in the art is within the scope of the present invention.

The flange 22 of the axle shaft 16 is drivingly connected to the hub member 30, preferably by means of wheel lug bolts 48. However, any other appropriate means, known in the art, to drivingly connect the flange 22 of the axle shaft 16 to the hub member 30, is within the scope of the present invention. The hub member 30 preferably includes a hub body 32 forming an axially extending bore 34 therethrough, as illustrated in FIG. 2. The anti-friction bearing assembly 42 is disposed within the bore 34 at a distal end 14 of the axle tube 12. A lip seal 46 is non-rotatably mounted within the bore 34 inboard of the bearing assembly 42 that seals against the axle tube 12 providing protection from contaminants entering the bore 34 of the hub member 30. Preferably, the anti-friction bearing assembly 42 is a single row roller bearing. However, any other appropriate types of bearings known in the art, such as single row ball bearings and double row roller bearings, are within the scope of the present invention.

The anti-friction bearing assembly 42 is fixed within the bore 34 by means of a bearing retainer that prevents axial displacement thereof. Preferably, the bearing retainer is in the form of an annular spacer ring 44 disposed between an outer race of the bearing assembly 42 and the flange 22 of the axle shaft 16.

Alternatively, as illustrated in FIG. 3, the bearing retainer may be in the form of a radially inwardly protruding snap ring 50 fitted in a groove 35 formed in the bore 34 of the hub body 32, so that the snap ring is located directly at an outboard end of the bearing assembly 42 for retaining the bearing assembly 42. In accordance with yet another embodiment of the present invention, the bearing retainer may be in the form of a radially outwardly protruding snap ring (not shown) fitted in a groove (not shown) formed in the axle tube 12 at the distal end 14 thereof.

As illustrated in FIG. 1, the hub body 32 of the hub member 30 is integrally formed with a drum portion 36 and a disc brake rotor 38 as a single-piece part, preferably by forging or casting. The drum portion 36 has a cylindrical inner surface 37 adapted to be frictionally engaged with a brake shoe 40, which functions as a parking brake.

Figure 5:
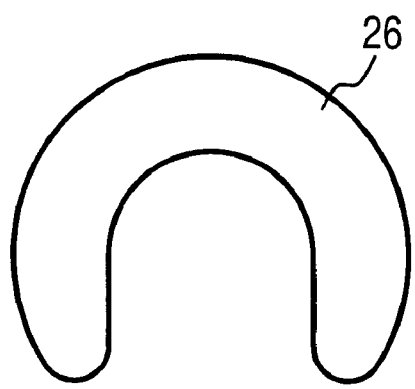
FIG. 5 is an elevation view of an exemplary C-ring axle shaft retainer.

The axle drive assembly 10 of the present invention further includes an axle shaft retainer for preventing outward axial displacement of the axle shaft 16 disposed at the inboard end 20 thereof. In accordance with the preferred embodiment of the present invention, located at the inboard end 20 of the axle shaft 16 is an annular recess 24, as illustrated in FIG. 4, that is axially aligned with a recess 28 formed on the corresponding side bevel gear 27, as illustrated in FIG. 6. A slotted washer, or C-ring, 26, shown in FIGS. 1 and 5, is fitted within the recesses 24 and 28 of the axle shaft 16 and side bevel gear 27 respectively, in order to limit outward axial movement of the axle shaft 16 relative to the side bevel gear 27. A differential cross shaft 29, shown in FIG. 1, limits inward axial movement of the axle shaft 16.

Therefore, the axle drive assembly 10 in accordance with the present invention represents a novel arrangement of the axle drive assembly that combines the three-quarter floating axle design with the C-ring axle shaft retainer. It permits higher axle load ratings than the existing semi-floating axle designs, and is simpler and lighter than the existing full-floating and three-quarter floating axle designs. The three-quarter floating axle drive assembly of the present invention does not require a bearing retaining nut, and uses less expensive wheel bearings. Since the bearing retainer nut is no longer required, threading of a mating part is eliminated, thus providing additional cost savings.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An axle drive assembly for a motor vehicle, said assembly comprising:
    an axle housing including an elongated axle tube;
    a rotatable axle shaft extending through said elongated axle tube, said axle shaft having an outboard end and an inboard end;
    a hub member rotatably supported on said axle tube, said hub member drivingly connected to said outboard end of said axle shaft;
    a sole single-row anti-friction bearing assembly disposed between said hub member and said axle tube for rotatably supporting said hub member on said axle tube solely by said single-row anti-friction bearing assembly without necessity of a second single-row anti-friction bearing assembly, said single-row anti-friction bearing assembly disposed at said outboard end of said axle shaft; and
    an axle shaft retainer provided to prevent axial displacement of said axle shaft so as to carry thrust loads applied to said axle shaft during load conditions, said shaft retainer disposed at said inboard end of said axle shaft.

2. The axle drive assembly as defined in claim 1, further including an axle flange secured to said outboard end of said axle shaft and drivingly connected to said hub member.

3. The axle drive assembly as defined in claim 2, wherein said axle flange is drivingly connected to said hub member by means of wheel lug bolts.

4. The axle drive assembly as defined in claim 2, wherein said axle flange is integrally formed with said outboard end of said axle shaft.

5. The axle drive assembly as defined in claim 4, wherein said axle flange is integrally formed with said axle shaft as a single-piece part.

6. The axle drive assembly as defined in claim 2, further including a bearing retainer for preventing axial displacement of said anti-friction bearing assembly.

7. The axle drive assembly as defined in claim 6, wherein said bearing retainer is an annular spacer ring disposed between said anti-friction bearing assembly and said axle flange.

8. The axle drive assembly as defined in claim 1, wherein said bearing assembly is a single-row ball bearing.

9. The axle drive assembly as defined in claim 1, wherein said bearing assembly is a single-row roller bearing.

10. The axle drive assembly as defined in claim 1, wherein said hub member comprises a hub body forming an axially extending bore therethrough receiving said anti-friction bearing assembly.

11. The axle drive assembly as defined in claim 1, wherein said hub member further comprises a disc brake rotor integrally formed thereon.

12. The axle drive assembly as defined in claim 11, wherein said disc brake rotor is integrally formed with said hub member as a single-piece part.

13. The axle drive assembly as defined in claim 1, further including a bearing retainer for preventing axial displacement of said anti-friction bearing assembly.

14. The axle drive assembly as defined in claim 13, wherein said bearing retainer is a snap ring mounted to said hub member adjacent to said anti-friction bearing assembly.

15. The axle drive assembly as defined in claim 13, wherein said bearing retainer is a snap ring mounted to said axle tube adjacent to said anti-friction bearing assembly.

16. An axle drive assembly for a motor vehicle, said assembly comprising:
    an axle housing including an elongated axle tube;
    a rotatable axle shaft extending through said elongated axle tube, said axle shaft having an outboard end and an inboard end;
    a hub member rotatably supported on said axle tube, said hub member drivingly connected to said outboard end of said axle shaft;
    a sole single-row anti-friction bearing assembly disposed between said hub member and said axle tube for rotatably supporting said hub member on said axle tube solely by said single-row anti-friction bearing assembly without necessity of a second single-row anti-friction bearing assembly, said single-row anti-friction bearing assembly disposed at said outboard end of said axle shaft; and
    an axle shaft retainer provided to prevent axial displacement of said axle shaft so as to carry thrust loads applied to said axle shaft during load conditions, said shaft retainer disposed at said inboard end of said axle shaft,
    wherein said axle shaft further comprises an annular groove formed at said inboard end thereof for receiving said axle shaft retainer.

17. The axle drive assembly as defined in claim 16, wherein said shaft retainer is a C-ring.

18. A three-quarter floating axle drive assembly for a motor vehicle, said assembly comprising:
    an axle housing including an elongated axle tube;
    a rotatable axle shaft extending through said elongated axle tube, said axle shaft having an outboard end, an inboard end and an axle flange integrally formed with said outboard end as a single-piece part;
    a hub member rotatably supported on said axle tube, said hub member drivingly connected to said axle flange of said axle shaft by means of wheel lug bolts;
    said hub member including a hub body forming an axially extending bore therethrough, and a disc brake rotor and a drum portion integrally formed thereon as a single-piece part;
    a sole single-row anti-friction bearing assembly disposed between said hub member and said axle tube for rotatably supporting said hub member on said axle tube solely by said single-row anti-friction bearing assembly without the necessity of a second single-row anti-friction bearing assembly, said single-row anti-friction bearing assembly disposed at said outboard end of said axle shaft in said bore in said hub member;
    a bearing retainer for preventing axial displacement of said anti-friction bearing assembly; and
    an axle shaft retainer in the form a C-ring for preventing axial displacement of said axle shaft so as to carry thrust loads applied to said axle shaft during load conditions, said C-ring disposed in an annular groove formed at said inboard end of said axle shaft.

19. The axle drive assembly as defined in claim 18, wherein said bearing retainer is a snap ring mounted to said hub member adjacent to said anti-friction bearing assembly.

20. The axle drive assembly as defined in claim 18, wherein said bearing retainer is a snap ring mounted to said axle tube adjacent to said anti-friction bearing assembly.

21. The axle drive assembly as defined in claim 18, wherein said bearing retainer is an annular spacer ring disposed between said anti-friction bearing assembly and said axle flange.

* * * * *